UNITED STATES PATENT OFFICE.

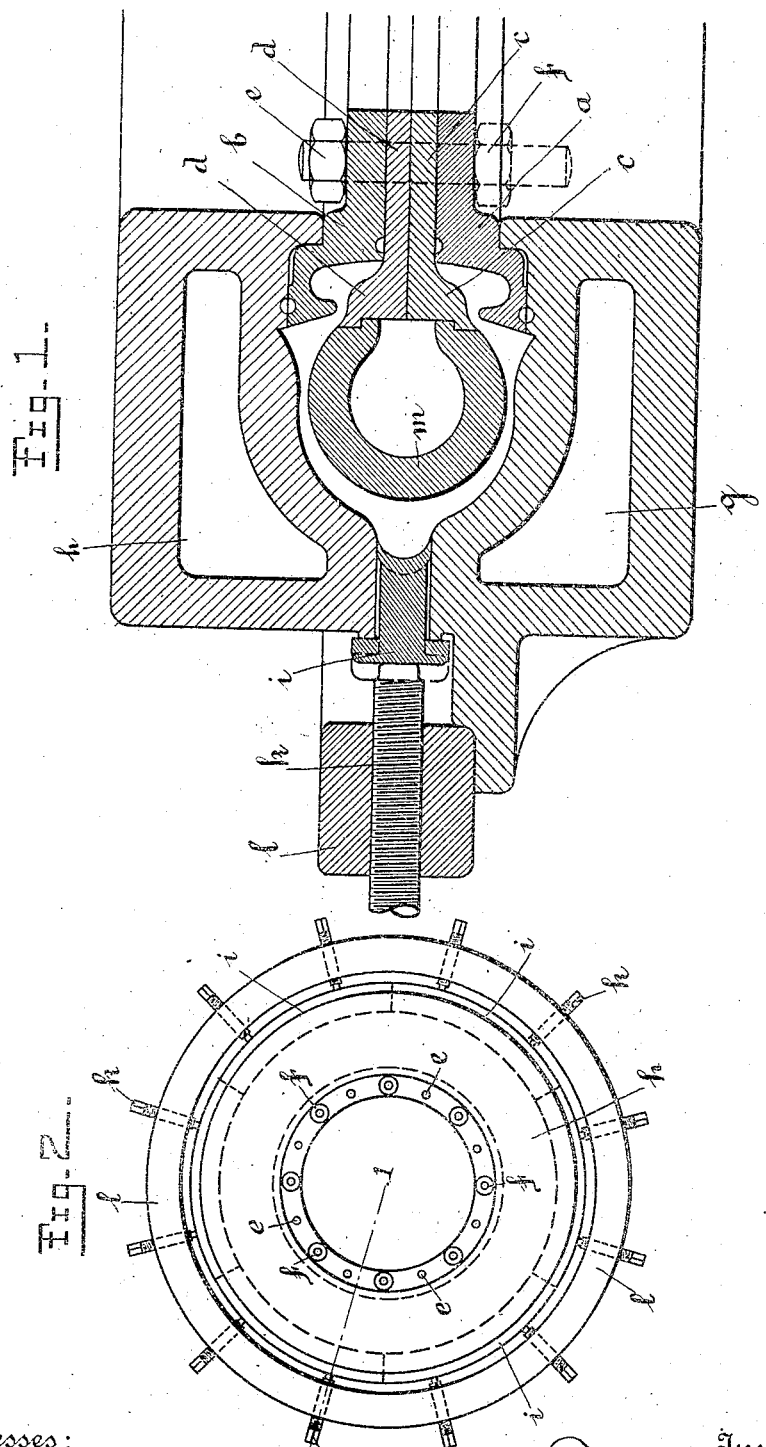

FRIEDRICH VEITH, OF VEITHWERK, NEAR HÖCHST, GERMANY.

MOLD FOR PNEUMATIC TIRES.

No. 865,458.  Specification of Letters Patent.  Patented Sept. 10, 1907.

Application filed September 28, 1906. Serial No. 336,522.

*To all whom it may concern:*

Be it known that I, FRIEDRICH VEITH, a subject of the Emperor of Germany, resident of Veithwerk, near Höchst, in the Grand Duchy of Hesse, Germany, have invented certain new and useful Improvements in Molds for Pneumatic Tires, of which the following is a specification.

My invention relates to molds for the manufacture of the casings or outer covers of pneumatic tires, and has for its object to provide for a construction in which the foundation of the article to be molded is securely held and the rubber mixture applied to such foundation shall be efficiently pressed and molded during the process of manufacture.

In the accompanying drawings I have shown an example of an apparatus embodying my invention.

Figure 1 is a sectional view of part of the apparatus taken on line 1—1 of Fig. 2 which is a plan view of the entire apparatus.

The apparatus comprises a core ring $m$ against the inner portion of which is applied another ring consisting of two sections $c$, $d$, each preferably fitted against the core ring by means of shoulders as shown in Fig. 1. The two sections, $c$, $d$, are fitted against each other with plane faces which in the use of the apparatus are disposed horizontally. Against these inner ring sections $c$, $d$, are fitted at the top and at the bottom mold sections $a$, $b$, which at their outer ends are so formed as to correspond in cross-section to the customary shape of the edges of the outer case, that is a hook shaped form. Screws or bolts $e$ allow the sections $a$, $b$, $c$, $d$, to be connected in two sets independently (that is, $a$ with $c$, and $b$ with $d$) so that the grooves adapted to receive the edges of the outer casing may be made wider, as desired, and also to enable the said edges to be clamped firmly in position together with the ends of the fabric layers before the molding operation proper is proceeded with; a series of screws or bolts $f$ serve to connect the two sets of mold sections $a$, $c$, and $b$, $d$, it being understood that the screws $e$ connect only the members $a$, $c$, or $b$, $d$, with each other.

In connection with the parts so far described I employ an upper mold section $h$ and a lower mold section $g$, each of them being ring-shaped and hollow for the circulation of steam or other heating medium. These sections are so constructed that a groove or slot will remain between them at the outside and this slot is adapted to be closed by the pressing ring $i$ constructed in segments. The segments may be moved inward by means of screws $k$ having a bearing in a ring $l$ supported on the lower mold section $g$. The entire apparatus is held together in any suitable manner, for instance by means of a spider.

In operation the unfinished outer case is placed around the core ring $m$ and upon the outer portions of the ring sections $c$, $d$; then the sections $a$, $b$, are applied so as to clamp the edge sections of the outer casing, and the screws $f$ are tightened, so that the ring $m$, the sections, $a$, $b$, $c$, $d$, and the outer case to be treated are firmly connected. These parts are then placed upon the lower mold section $g$, the upper mold section $h$ is placed on top and the entire apparatus is held together by the clamping spider hereinbefore referred to or any other suitable means. Of course the customary rubber composition has been put on the incomplete outer case before closing the mold. The mold is then heated so as to liquefy the rubber and then the segments $i$ are moved inward by means of the screws $k$ so as to exert pressure on the liquid rubber and mold it to the desired shape, at the same time causing it to penetrate the fabric layers employed in the structure of the outer case.

It will be obvious that according as the clamps $i$ are moved inward more or less the shape of the tread surface may be varied while using one and the same mold.

In Fig. 1 the production of a central rib on the tread surface has been suggested. The size of this rib may be readily varied, and if segments $i$ are made of a proper shape they may be caused to project beyond the inner surface so as to produce a groove in the outer case instead of a rib. The segments $i$ should be so guided between the mold sections $g$, $h$, that during the act of moving the segments inward any surplus or excess rubber may escape from the mold cavity.

I claim:

1. A mold for the outer casings of pneumatic tires, comprising upper and lower mold sections adapted to receive the unfinished casing between them, and having an annular groove or slot between them, and a contractile ring movable in said groove or slot.

2. A mold for the outer casings of pneumatic tires, comprising upper and lower mold sections adapted to receive the unfinished casing between them, and having an annular groove or slot between them, and a segmental ring the segments of which are movable radially in said groove or slot.

3. A mold for the outer casings of pneumatic tires, comprising upper and lower mold sections adapted to receive the unfinished casing between them, a ring surrounding the mold, segments movable radially in said groove or slot, and adjusting screws extending from said ring to the segments.

4. A mold for the outer casings of pneumatic tires, comprising a stationary core made in sections, and movable outer mold sections coöperating with the core sections.

5. A mold for the outer casings of pneumatic tires, comprising a core consisting of a core ring, and of upper and lower inner core sections fitted against said ring, edge-forming sections engaging said inner core sections, and outer sections embracing the edge-forming sections and surrounding the core sections.

6. A mold for the outer casings of pneumatic tires, comprising a core consisting of a core ring and of movable inner sections, edge-forming sections each connected individually with one of the inner core sections, so as to clamp each edge of the outer casing separately, and outer sections surrounding the core sections.

In testimony whereof, I have hereunto set my hand in the presence of two subscribing witnesses.

FRIEDRICH VEITH.

Witnesses:
WALTER HOUSING,
WALTER SCHUMANN.